United States Patent
Singh et al.

(10) Patent No.: US 12,232,070 B2
(45) Date of Patent: Feb. 18, 2025

(54) SYSTEM AND METHOD OF DUAL-SIM UEs OPERATION IN 5G NETWORKS

(71) Applicant: NEC Corporation, Tokyo (JP)

(72) Inventors: Shubhranshu Singh, Heidelberg (DE); Takahito Yoshizawa, Boom (BE)

(73) Assignee: NEC CORPORATION, Tokyo (JP)

( * ) Notice: Subject to any disclaimer, the term of this patent is extended or adjusted under 35 U.S.C. 154(b) by 425 days.

(21) Appl. No.: 17/607,108

(22) PCT Filed: May 1, 2020

(86) PCT No.: PCT/EP2020/062215
§ 371 (c)(1),
(2) Date: Oct. 28, 2021

(87) PCT Pub. No.: WO2020/225160
PCT Pub. Date: Nov. 12, 2020

(65) Prior Publication Data
US 2022/0159607 A1    May 19, 2022

(30) Foreign Application Priority Data

May 3, 2019  (EP) .................................. 19172624

(51) Int. Cl.
H04W 60/00   (2009.01)
H04W 8/20    (2009.01)
H04W 8/22    (2009.01)
H04W 48/18   (2009.01)

(52) U.S. Cl.
CPC .......... *H04W 60/005* (2013.01); *H04W 8/20* (2013.01); *H04W 8/22* (2013.01); *H04W 48/18* (2013.01)

(58) Field of Classification Search
CPC ....... H04W 60/005; H04W 8/20; H04W 8/22; H04W 48/18; H04W 12/45
See application file for complete search history.

(56) References Cited

U.S. PATENT DOCUMENTS

| | | | |
|---|---|---|---|
| 11,412,478 B2 | 8/2022 | Ryu et al. | |
| 2014/0171029 A1 | 6/2014 | Holtmanns | |
| 2018/0160422 A1 | 6/2018 | Pathak et al. | |
| 2020/0037386 A1 | 1/2020 | Park et al. | |

(Continued)

FOREIGN PATENT DOCUMENTS

| | | |
|---|---|---|
| CN | 103782615 A | 5/2014 |
| EP | 4007422 A1 | 6/2022 |

(Continued)

OTHER PUBLICATIONS

Japanese Office Action for JP Application No. 2021-564841 mailed on Nov. 22, 2022 with English Translation.

(Continued)

Primary Examiner — Joseph E Dean, Jr.

(57) ABSTRACT

Many commercially deployed devices support more than one SIM cards. Support for multi-USIM is currently handled in an implementation-specific manner without any support from 3GPP specifications. With the increased complexity of 5G-capable UEs and with growing demand for multi-USIM devices in the market, it becomes important to consider system enhancements that would allow for more efficient solution involving required support to UE from 5G core and 5G-RAN.

11 Claims, 11 Drawing Sheets

(56) References Cited

U.S. PATENT DOCUMENTS

2021/0282103 A1  9/2021  Zhu et al.
2021/0352619 A1  11/2021  Ryu et al.
2022/0369280 A1* 11/2022  Ryu .................... H04W 68/02

FOREIGN PATENT DOCUMENTS

| JP | 2018-511263 A | 4/2018 |
| JP | 2022-524122 A | 4/2022 |
| WO | 2018/141081 A1 | 8/2018 |
| WO | 2018/174525 A1 | 9/2018 |
| WO | 2020/185949 A2 | 9/2020 |
| WO | 2020/247043 A1 | 12/2020 |

OTHER PUBLICATIONS

Intel, "On remaining open issues for FS_RACS", 3GPP TSG SA WG2 #131, S2-1902914, Mar. 8, 2019.

Vivo, China Telecom, "New Rel-17 SID proposal: Study on multi-SIM devices in RAN", 3GPP TSG RAN #83, RP-190282, Mar. 11, 2019.

Intel, Qualcomm, "Use Case: Support Mobile Terminated Services for Multi-USIM Devices", 3GPP TSG SA WG1 #86, S1-191019, Apr. 26, 2019.

International Search Report for PCT Application No. PCT/EP2020/062215, mailed on Aug. 24, 2020.

Written opinion for PCT Application No. PCT/EP2020/062215, mailed on Aug. 24, 2020.

3GPP TR 21.905: "Vocabulary for 3GPP Specifications" V15.0.0 (Mar. 2018).

3GPP TS 23.501: "System Architecture for the 5G System; Stage 2" V16.0.0 (Mar. 2019).

3GPP TS 23.502: "Procedures for the 5G System; Stage 2" V16.0.0 (Mar. 2019).

New SID: Study on system enablers for multi-SIM devices, 3GPP TSG SA Meeting #SP-82 SP-181251, Dec. 12, 2018.

3GPP TR 23.743: "Study on optimizations of UE radio capability signalling" V2.0.0 (Mar. 2019).

Ericsson: "Solution#7—further updates", 3GPP Draft; S2-1812651, SA WG2 Temporary Document, SA WG2 Meeting #S2-129BIS, Nov. 30, 2018.

Ericsson: "Solution to KI#2 and KI#3 for how the UE radio capabilities signalled and stored", 3GPP Draft; S2-188640, SA WG2 Meeting #128bis, Aug. 26, 2018.

CN Office Action for Chinese Patent Application No. 202080048614.0, mailed on Oct. 27, 2023 with English Translation.

EP Office Action for European Patent Application No. 20727919.1, mailed on Dec. 15, 2023.

JP Office Action for JP Application No. 2021-564841, mailed on Jun. 27, 2023 with English Translation.

* cited by examiner

SYSTEM AND METHOD OF DUAL-SIM UEs OPERATION IN 5G NETWORKS

This application is a National Stage Entry of PCT/EP2020/062215 filed on May 1, 2020, which claims priority from European Patent Application 19172624.9 filed on May 3, 2019, the contents of all of which are incorporated herein by reference, in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to multi-SIM user equipment (UE) in the so-called '5G' (or 'Next Generation') systems.

BACKGROUND ART

Many commercially deployed devices support more than one SIM card (typically two SIMs). Support for multi-USIM is currently handled in an implementation-specific manner without any support from 3GPP specifications and 5G core and 5G RAN. With the increased complexity of 5G-capable UEs and with growing demand for multi-USIM devices in the market, it has become important to consider solutions and system enhancements that would allow for a more efficient solution involving required support to UE from 5G core and 5G-RAN, and to support various new use cases and applications.

Related to a multi-SIM capable device, at least the following problems have been identified:
1. The 5G-RAN and the core network (e.g. an Access and Mobility Management Function (AMF) in the core network) are not aware of the UE's multi-SIM capability (e.g. two/more SIMs in the same UE) and the UE's radio capability (e.g. number of supported transceivers). This causes a problem, for example:
   A multi-SIM UE may establish connection and access to a (R)AN that does not support and provide features required by the UE with more than one SIM. Thus, any subsequent request from the UE for specific services gets rejected or silently discarded.
   A multi-SIM UE may get registered to an AMF (and other core Network Entities) that does not support and provide features required by multi-SIM scenarios. Thus any subsequent request from the UE for specific services gets rejected or silently discarded.
2. Currently the UE is not made aware of whether or not certain (R)AN and core Network Function instances (e.g. AMF) support functionalities and services requested and needed for its multi-SIM use case specific requirements.

SUMMARY OF INVENTION

Technical Problem

Accordingly, the present invention seeks to provide methods and associated apparatus that provide improvements related to multi-SIM capability UEs, for example by at least partially addressing or at least alleviating one or more of the above issues.

Solution to Problem

In one aspect, the invention provides a method performed by a User Equipment (UE) comprising a plurality of Subscriber Identity Modules (SIMs), the method comprising: transmitting, to a node of a Radio Access Network (RAN), in a Radio Resource Control (RRC) message, information indicating a Multi-SIM capability of the UE, for use by said node in selecting, for the UE, an Access and Mobility Management Function (AMF) supporting said Multi-SIM capability.

In one aspect, the invention provides a method performed by a node of a Radio Access Network (RAN), the method comprising: receiving, from a User Equipment (UE) comprising a plurality of Subscriber Identity Modules (SIMs), in a Radio Resource Control (RRC) message, information indicating a Multi-SIM capability of the UE; and selecting, for the UE, an Access and Mobility Management Function (AMF) supporting said Multi-SIM capability.

In one aspect, the invention provides a method performed by a User Equipment (UE) comprising a plurality of Subscriber Identity Modules (SIMs), the method comprising: transmitting, to an Access and Mobility Management Function (AMF), in a Non-Access Stratum (NAS) message, information indicating a Multi-SIM capability of the UE, for use by said AMF in verifying whether the UE has a subscription for Multi-SIM.

In one aspect, the invention provides a method performed by an Access and Mobility Management Function (AMF), the method comprising: receiving, from a User Equipment (UE) comprising a plurality of Subscriber Identity Modules (SIMs), in a Non-Access Stratum (NAS) message, information indicating a Multi-SIM capability of the UE; and verifying whether the UE has a subscription for Multi-SIM.

In one aspect, the invention provides a User Equipment (UE) comprising a controller, a transceiver, and a plurality of Subscriber Identity Modules (SIMs); wherein the controller is configured to control the transceiver to transmit, to a node of a Radio Access Network (RAN), in a Radio Resource Control (RRC) message, information indicating a Multi-SIM capability of the UE, for use by said node in selecting, for the UE, an Access and Mobility Management Function (AMF) supporting said Multi-SIM capability.

In another aspect, the invention provides a User Equipment (UE) comprising: a plurality of Subscriber Identity Modules (SIMs); and means for transmitting, to a node of a Radio Access Network (RAN), in a Radio Resource Control (RRC) message, information indicating a Multi-SIM capability of the UE, for use by said node in selecting, for the UE, an Access and Mobility Management Function (AMF) supporting said Multi-SIM capability.

In one aspect, the invention provides a node of a Radio Access Network (RAN), the node comprising a controller and a transceiver, wherein the controller is configured to: control the transceiver to receive, from a User Equipment (UE) comprising a plurality of Subscriber Identity Modules (SIMs), in a Radio Resource Control (RRC) message, information indicating a Multi-SIM capability of the UE; and select, for the UE, an Access and Mobility Management Function (AMF) supporting said Multi-SIM capability.

In another aspect, the invention provides a node of a Radio Access Network (RAN), the node comprising: means for receiving, from a User Equipment (UE) comprising a plurality of Subscriber Identity Modules (SIMs), in a Radio Resource Control (RRC) message, information indicating a Multi-SIM capability of the UE; and means for selecting, for the UE, an Access and Mobility Management Function (AMF) supporting said Multi-SIM capability.

In one aspect, the invention provides a User Equipment (UE) comprising a controller, a transceiver, and a plurality of Subscriber Identity Modules (SIMs); wherein the controller is configured to control the transceiver to transmit, to an Access and Mobility Management Function (AMF), in a Non-Access Stratum (NAS) message, information indicating a Multi-SIM capability of the UE, for use by said AMF in verifying whether the UE has a subscription for Multi-SIM.

In another aspect, the invention provides a User Equipment (UE) comprising: a plurality of Subscriber Identity Modules (SIMs); and means for transmitting, to an Access and Mobility Management Function (AMF), in a Non-Access Stratum (NAS) message, information indicating a Multi-SIM capability of the UE, for use by said AMF in verifying whether the UE has a subscription for Multi-SIM.

In one aspect, the invention provides an Access and Mobility Management Function (AMF) comprising a controller and a transceiver, wherein the controller is configured to: control the transceiver to receive, from a User Equipment (UE) comprising a plurality of Subscriber Identity Modules (SIMs), in a Non-Access Stratum (NAS) message, information indicating a Multi-SIM capability of the UE; and verify whether the UE has a subscription for Multi-SIM.

In another aspect, the invention provides an Access and Mobility Management Function (AMF) comprising: means for receiving, from a User Equipment (UE) comprising a plurality of Subscriber Identity Modules (SIMs), in a Non-Access Stratum (NAS) message, information indicating a Multi-SIM capability of the UE; and means for verifying whether the UE has a subscription for Multi-SIM.

Aspects of the invention extend to corresponding systems and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Embodiments of the invention will now be described, by way of example, with reference to the accompanying drawings in which:

DESCRIPTION OF EMBODIMENTS

Overview

Figure 1:
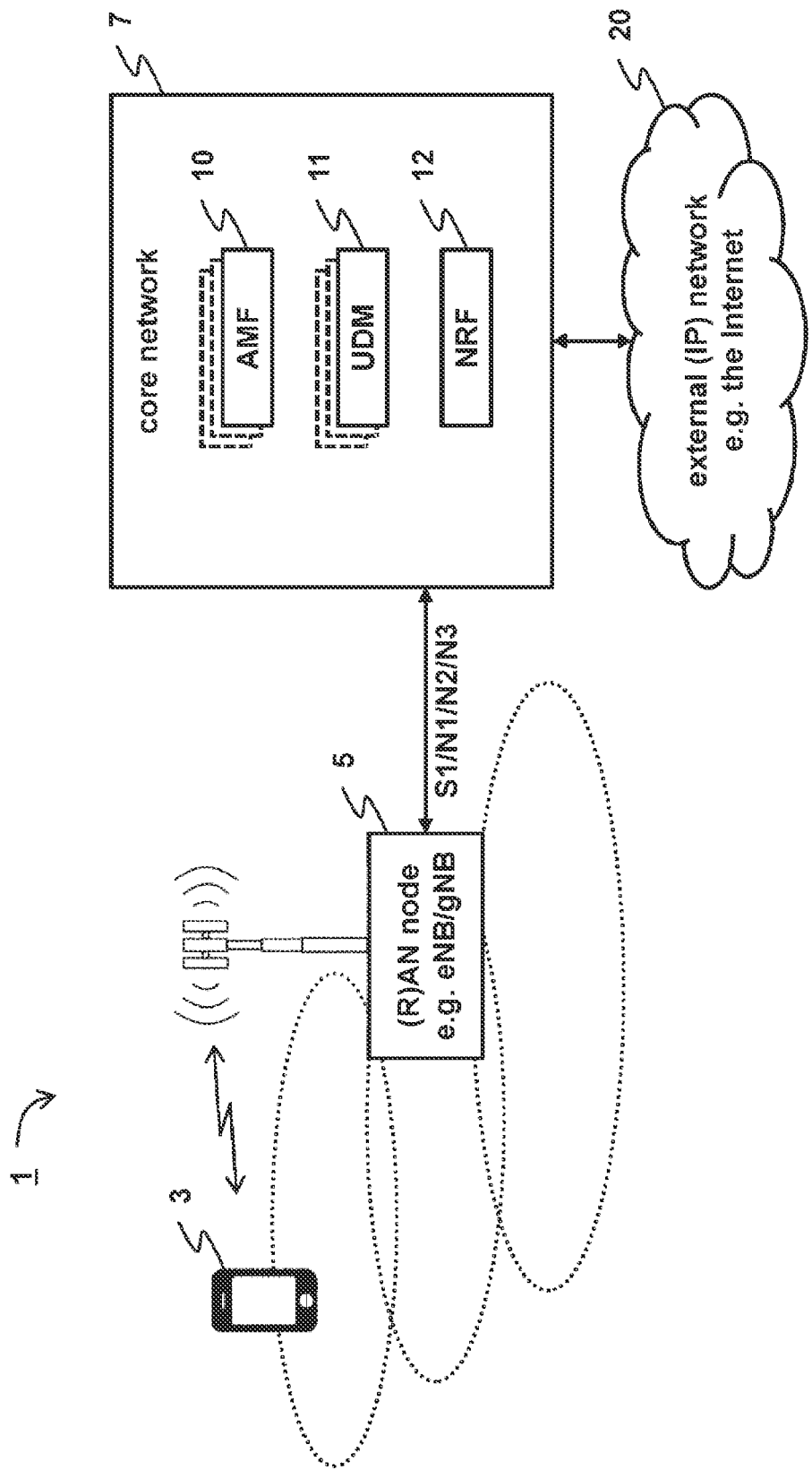
FIG. 1 illustrates schematically a generic mobile (cellular or wireless) telecommunication system to which embodiments of the invention may be applied.

FIG. 1 schematically illustrates a mobile (cellular or wireless) telecommunication system 1 to which the above embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 (or 'RAN node') controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNB'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). For example, it will be appreciated that the core network 7 may include, amongst others: one or more Access and Mobility Management Function (AMF) 11; one or more Unified Data Management (UDM) node 12; and a Network Repository Function (NRF) 12.

From the core network 7, connection to an external IP network 20 (such as the Internet) is also provided.

Beneficially, the components of this system 1 are configured to provide improved support for UEs 3 that are capable of operating with more than one SIM card.

In examples described, the UE 3 beneficially provides a multi-SIM capability indicator (and/or a UE radio capability) to a core network function.

This multi-SIM capability indication by the UE 3 may be provided in a Radio Resource Control (RRC) message to the RAN node 5 (base station). Based on the multi-SIM capability indication by the UE 3 the RAN node 5 may select a multi-SIM supporting AMF, if available. To facilitate this selection, the AMF 10 may indicate its multi-SIM support capability to the RAN node 5 during an NG Setup procedure or during an NG-RAN Configuration Update procedure. If multi-SIM support capability is not supported, then the RAN node 5 may reject the RRC message with a message including an appropriate reject cause sent to the UE 3. If rejected, the UE3 may come back to the same RAN node 5 as a Single-SIM capable UE 3 (i.e. without providing the multi-SIM capability indication).

The multi-SIM capability indication by the UE 3 may be provided in a Non-Access Stratum (NAS) message sent to the AMF 10 to attempt registration at the AMF 10. The RAN 5 may forward this NAS message to the AMF 10 and, based on the multi-SIM indication by the UE 3, the AMF 10 may verify the UE subscription for multi-SIM support with the UDM 11. If supported by subscription, the AMF 10 may confirm the registration for the multi-SIM UE 3. If not supported by subscription, the AMF 10 may reject the registration with a reject cause. The AMF 10 may re-route the UE 3 to a multi-SIM supporting AMF 10, if appropriate.

User Equipment (UE)

Figure 2:
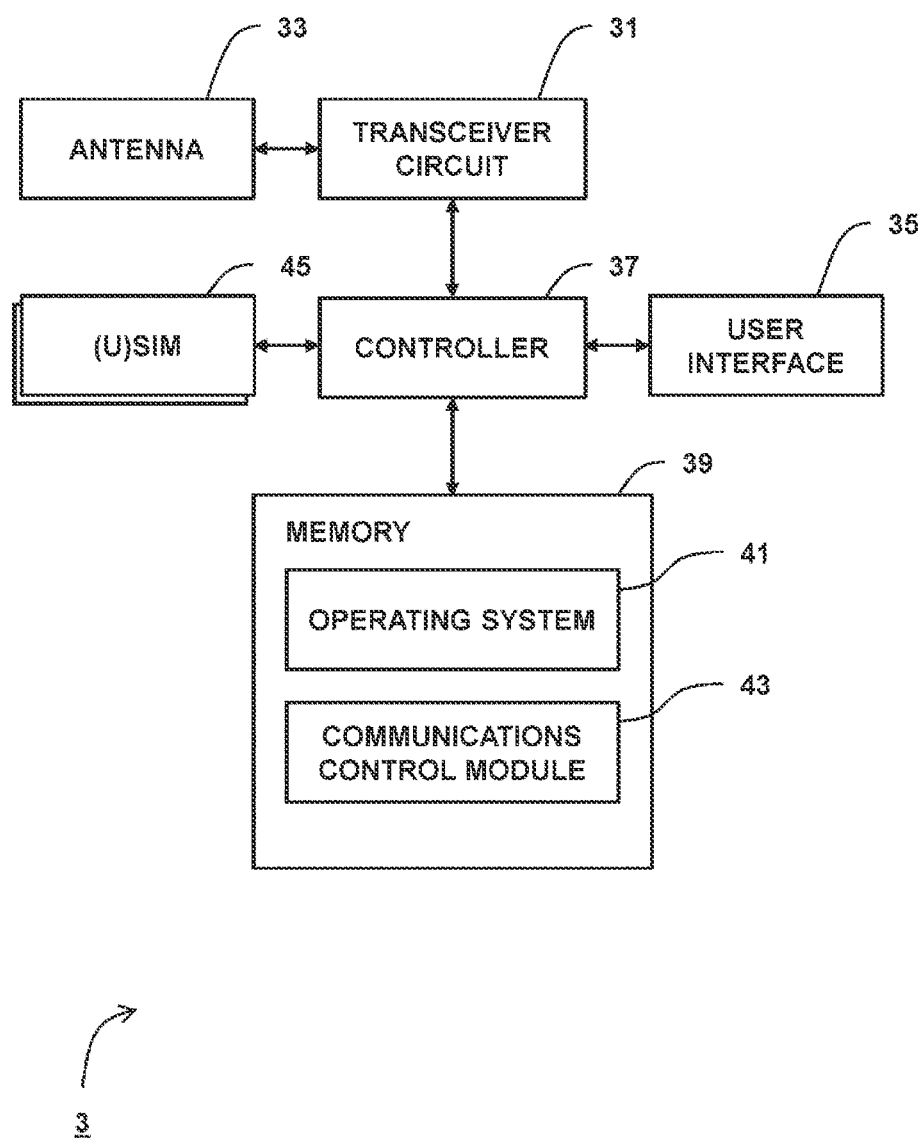
FIG. 2 is a schematic block diagram of a mobile device (user equipment) forming part of the system shown in FIG. 1.

FIG. 2 is a block diagram illustrating the main components of the UE (mobile device 3) shown in FIG. 1. As shown, the UE includes a transceiver circuit 31 which is operable to transmit signals to and to receive signals from the connected node(s) via one or more antenna 33. Although not necessarily shown in FIG. 2, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5, core network nodes, and application functions. Such signaling includes appropriately formatted requests and responses relating to the UE's multi-SIM capability and associated procedures.

Although not shown in FIG. 2, the communications control module 43 will typically include at least an RRC sub-module and a NAS sub-module. The RRC sub-module is operable to generate, send and receive signalling messages formatted according to the RRC standard. For example, such messages are exchanged between the mobile device 3 and its serving base station 5. The NAS sub-module is operable to generate, send and receive signalling messages formatted according to the NAS standard. For example, such NAS messages are exchanged between the mobile device 3 and the AMF 10 (via the serving base station 5, using the RRC sub-module).

The term "UE" refers to the mobile phone in general, which includes at least the following components:

Mobile Equipment (ME): the ME is the "mobile phone" as the hardware device. It includes at least one processor (controller), memory unit, antenna, transceiver unit, user interface (such as screen, buttons, cable socket), battery unit, etc., as described with reference to FIG. 2 above.

Subscriber Identity Module (SIM) or Universal Subscriber Identity Module (USIM): the SIM or USIM is an application that runs in the UICC card. The UICC card is a small integrated circuit that includes an associated processor (controller), a communication module, a memory unit, and an interface unit to communicate with the ME part of the UE 3. The UICC is also called a "smart card". The processor controls the operation of the USIM in accordance with software stored in the memory. The USIM software includes, among other things, an operating system (OS), and a communications control module.

The term 'SIM' generally refers to the application in the UICC card that is used in 2G GSM mobile system. The term 'USIM' generally refers to the application in the UICC card that is used in 3G (UMTS), 4G (LTE), and 5G systems. In addition, 'eSIM' is a SIM functionality embedded in the ME 30 itself, rather than being provided using a physical (removable) UICC card. In most technical contexts, these terms are interchangeable, and the term 'SIM' is more generic. From the perspective of the present disclosure, the terms 'SIM', 'USIM', and 'eSIM' are used interchangeably. The SIM and USIM application and eSIM contain the credentials, such as the long term identifier (IMSI in 3GPP) and long term secret key.

In this disclosure, either 'ME', 'mobile device', or simply 'device' is used to refer to the same entity, namely the mobile handset in general for any generation of technology. In addition, 'SIM' or 'USIM' are used in this disclosure depending on the context. However, they generally refer to the applications that reside in the UICC.

The UE may be a multi-SIM device. Typically, a multi-SIM capable mobile device is equipped with two SIM card slots, thus it is also generally referred to as a 'dual-SIM phone'. In another UE implementation, the mobile device is equipped with one SIM card slot and another SIM functionality is embedded in hardware ('eSIM'). The mobile device may have an individual IMEI for each SIM, or a single IMEI common to all SIMs in the mobile device. One example of having single IMEI common to all SIMs is when a single UICC card contains multiple USIM applications.

The multi-SIM device/UE may be equipped with one or more transceiver circuits 31, depending on hardware implementation. When present, such multiple transceiver circuits 31 enable simultaneous connection using multiple SIMs.

(R)AN Node

Figure 3:
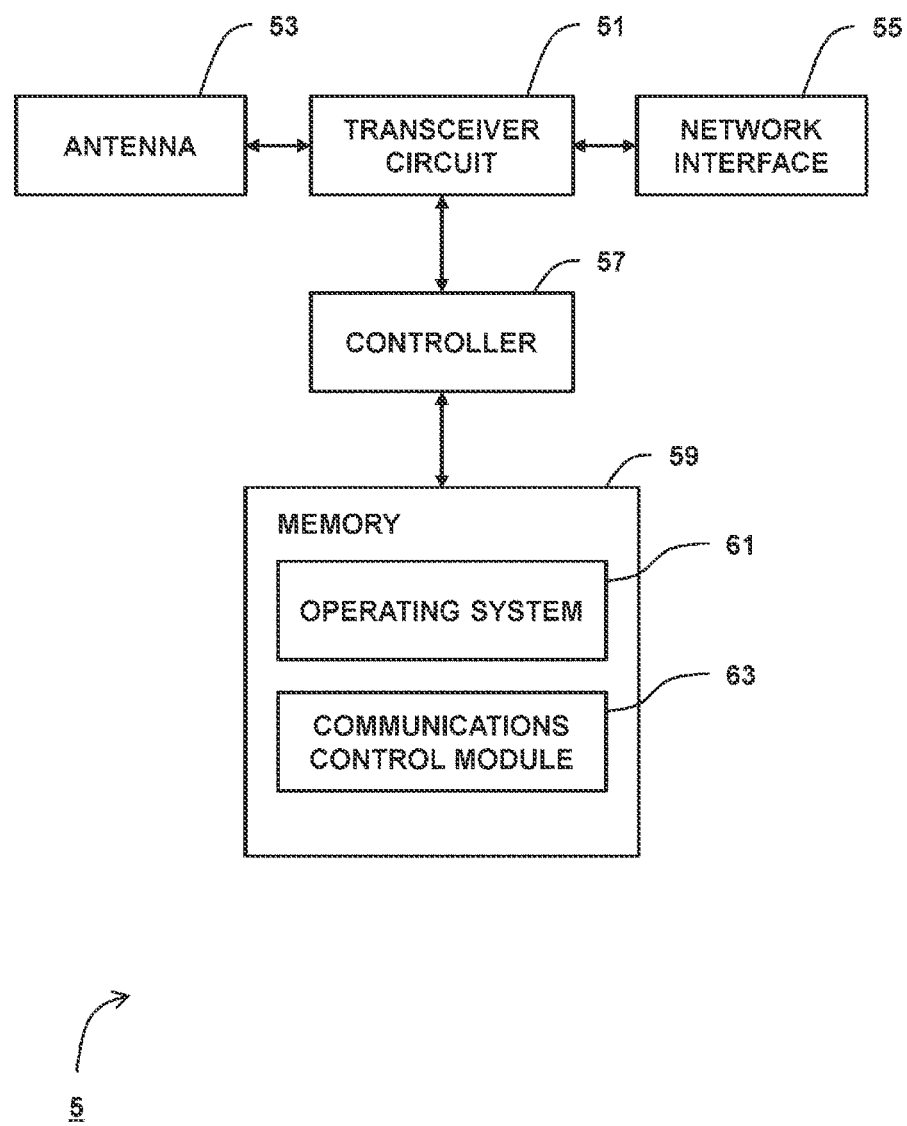
FIG. 3 is a schematic block diagram of a base station apparatus forming part of the system shown in FIG. 1.

FIG. 3 is a block diagram illustrating the main components of an exemplary (R)AN node 5 (base station) shown in FIG. 1. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes/AFs 12. Such signaling includes appropriately formatted requests and responses relating to the UE's multi-SIM capability and associated procedures.

Core Network Node

Figure 4:
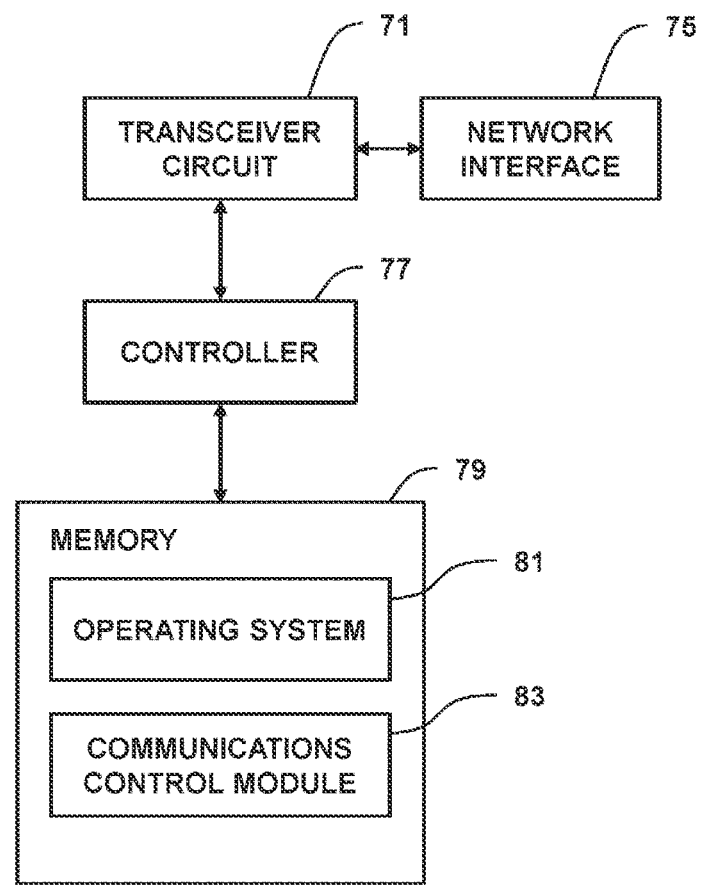
FIG. 4 is a schematic block diagram of a core network node (or OAM node/application function) forming part of the system shown in FIG. 1.

FIG. 4 is a block diagram illustrating the main components of a generic core network node (or function) which may be configured to implement any of the core network nodes or functions shown in FIGS. 1 and 5 to 11, for example, the AMF 10, the UDM 11, and the NRF 12. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, the UDM 11, the NRF 12, and other core network nodes. Such signaling includes appropriately formatted requests and responses relating to the UE's multi-SIM capability and associated procedures.

DETAILED DESCRIPTION

The following description is applicable in particular to UEs with more than one SIM and to different scenarios and use cases, including but not limited to:

Dual SIM Dual Standby (DSDS) devices (Reference: GSMA TS.37: Requirements for Multi SIM devices, ver 5.0);

UEs with a single transmitter and a single receiver;

UEs with single transmitter and multiple receivers;

SIMs that belong to the same MNOs (e.g. one is for a personal subscription and the other is for a business subscription, both used on same device).

Embodiment 1

Figure 5:
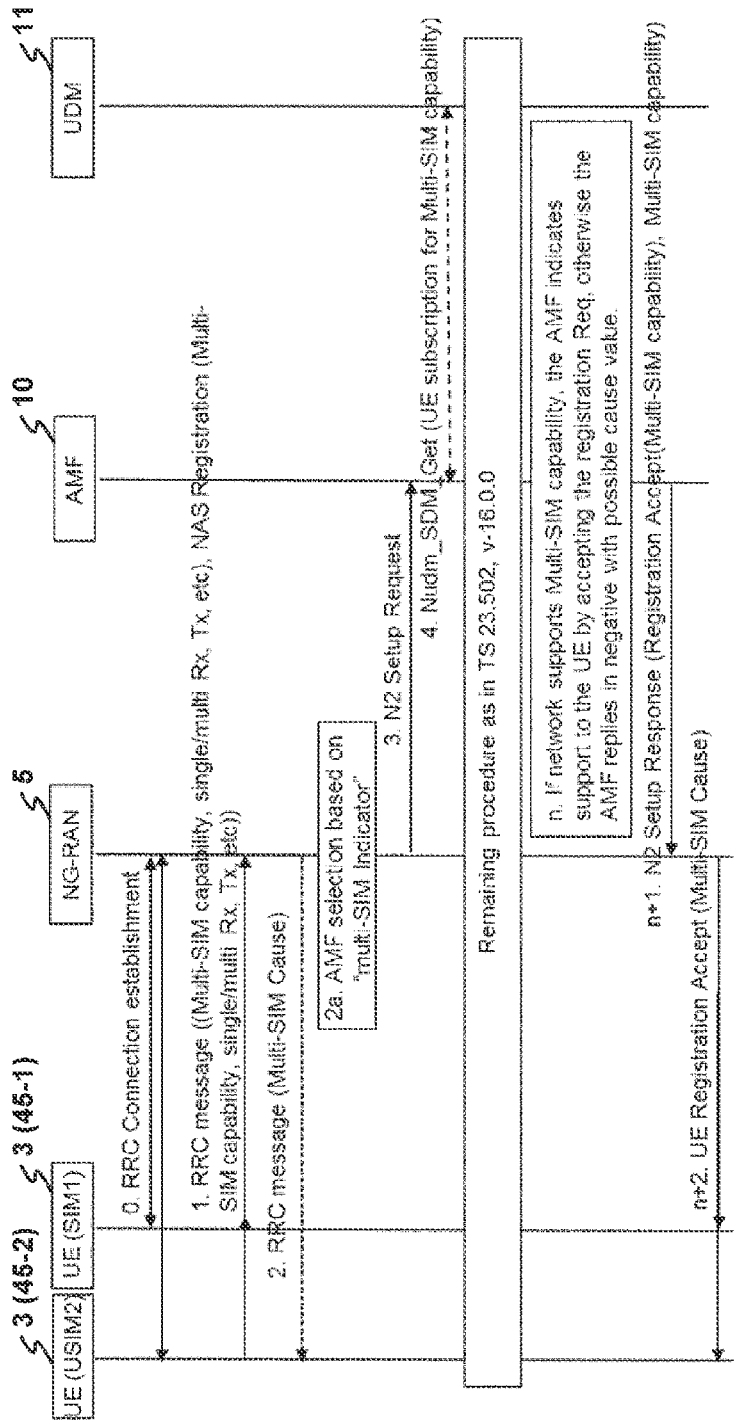
FIG. 5 illustrates schematically an enhanced UE registration procedure to support a multi-SIM UE, where SIMs are registered to the same AMF.
Figure 6:
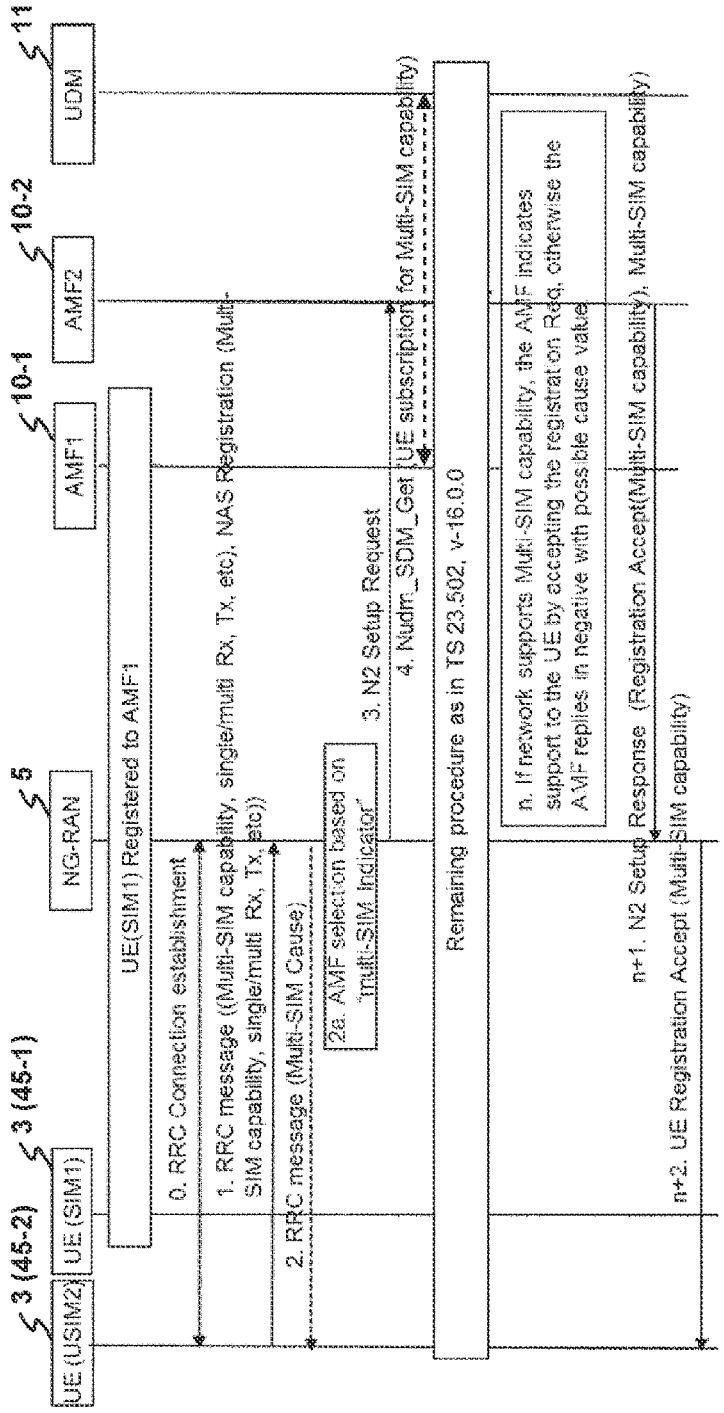
FIG. 6 illustrates schematically a procedure to support a multi-SIM UE, where the SIMs are registered to different AMFs.

The first embodiment proposes a method and a system to address at least one problem explained above specific to a UE 3 with more than one SIMs/USIMs 45. This embodiment proposes a method and a system as explained below. The proposed method and system enable a multi-SIM UE 3 to send a notification including an indication of the multi-SIM capability which the UE 3 has. The notification may include an indication of at least one transceiver(s) supported by the UE 3. The description of this embodiment further includes:

Procedures as shown in FIGS. 5 and 6. In these procedures the RAN functionality is enabled to select, and/or relocate to, an AMF 10 that is able to provide service(s) required by the multi-SIM UE 3. The selected or relocated AMF 10 may be the most suitable AMF to provide the service(s).

In step 2a, based on appropriate parameters e.g. a multi-SIM capability indicator, the RAN 5 (base station) selects an AMF 10 that can provide service(s) required by a UE 3 with two/more SIMs.

The RAN 5 may also inform a lack of requested capability support to the UE 3. The UE 3 may then access another RAN 5 (e.g. in overlapping coverage-area cases) or the UE 3 may access the same RAN 5 without any additional information with regard to the UE's multi-SIM capability (effectively, in the absence of such a multi-SIM capability indicator, the UE 3 appears to the network as a single SIM UE 3) and the registration procedure may then be repeated by the UE 3 for each of the SIMs 45.

An additional parameter is sent via an RRC message (e.g. a multi-SIM capability, single and/or a multiple receiver and/or transceiver) and NAS message (e.g. multi-SIM capability, single and/or multiple receiver and/or transceiver). The additional parameter (e.g. single/multiple receiver and transmitter) helps the 5G core network in determining whether UE specific paging optimization or coordination is necessary or not, taking into account the UE's 3 capability. For example, the AMF can determine whether the UE 3 can receive two SIMs signaling simultaneously or not. If the UE 3 can simultaneously receive signaling destined to different SIMs 45, then the UE 3 can behave as usual and no additional support is necessary.

The UDM 11 stores "multi-SIM" related information (e.g. information indicating whether to allow or prohibit multi-SIM operation) corresponding to the UE's subscription profile, and requires the AMF 10 to fetch subscription and policies information from the UDM 11 and a Policy Control Function (PCF), respectively.

FIG. 5 illustrates schematically an enhanced UE registration procedure to support a multi-SIM UE 3, where the SIMs 45 are registered to the same AMF 10.

The procedures shown in FIG. 5 are explained below. The registration procedure for SIM #1 and USIM #2 (or SIM #2) are independent. In the case of the same PLMN, AMF selection and re-location mechanisms result in the same AMF 10 being selected for SIM #1 and SIM #2.

Step 0: RRC connection has been established

Step 1: The UE 3 sends, to the NG-RAN 5, an RRC message including new parameter(s) to indicate the UE's multi-SIM capability. The UE 3 may additionally include its radio capability which is single/multiple receiver and transmitter. The UE 3 may send, to the NG-RAN, an NAS message including the new parameter(s).

Step 2: Based on the received AN parameter(s) including a request for "multi-SIM" capability and additionally receiver/transceiver capabilities, the RAN decides whether or not the RAN supports the requested functionalities. In case the RAN does not support the requested functionalities, the RAN 5 may reply back to the UE 3 with a lack of support with a cause value. The UE 3 then may join another RAN 5 (e.g. in overlapping coverage-area cases) or the UE may access the same RAN 5 without any additional information with regard to the UE's multi-SIM capability e.g. using a single SIM UE registration procedure. To help this process, the RAN 5 may also periodically broadcast and provide its (multi-SIM) capability information which can be monitored by UEs 3 to allow a UE 3 to know the multi-SIM capability before sending its request, as in step 1 above, to the RAN 5.

Step 2a: Based on the received parameter(s) in step 2, the RAN 5 selects an AMF 10 that supports functionalities that are required by the multi-SIM capable UE 3, instead of selecting a default AMF 10 and/or forwarding to an AMF 10 e.g. based on received NSSAI information. To determine the most suitable AMF 10, the RAN 5 can perform one or more of the following steps:
  i. The RAN 5 may have a list including at least one (pre-) configured AMF(s) and the RAN 5 may select a particular AMF 10 for this purpose e.g. an AMF 10 supporting requested functionalities;
  ii. The RAN 5 may select the same AMF 10 for SIM #1 and SIM #2. The RAN 5 may learn the AMF 10 with which SIM #1 (and SIM #2 belonging to the same UE 3) are registered to, as part of separate procedure e.g. those provided in embodiment 2;
  iii. The RAN 5 selects an AMF 10 based on information obtained in the N2 setup procedures as explained in embodiment 2 (shown in FIG. 7), to find AMFs;
  iv. The RAN 5 selects an AMF 10 based on information obtained in the NG-RAN configuration update procedures as explained in embodiment 2 (shown in FIG. 8) to find the AMF(s) 10. The AMF(s) 10 found may be the most suitable AMF(s) 10.

Step 3: The RAN 5 forwards the received NAS message (e.g. N2 setup request message) to the AMF 10 selected in step 2a above.

Step 4: The AMF 10 follows procedures with the UDM 11 in order to retrieve and confirm subscription information for the multi-SIM UE 3. Nudm_SDM_Get service request/reply are exchanged with additional information related to the multi-SIM capability and subscriptions. Although, FIG. 5 shows one UDM 11 and one step 4, step 4 may be repeated as many times as the number of SIMs 45 being handled. The AMF 10 may access another UDM 11 because each associated UDM 11 for a respective SIM 45 may be different.

The remaining registration procedures are executed before step 5, as explained in 3GPP TS 23.502 v16.0.0 [3].

Step n: The AMF 10 determines whether the network supports multi-SIM functionalities or not.

Step n+1: The AMF 10 informs the NG-RAN 5 of successful registration procedure. However, in the case of a lack of multi-SIM functionalities support (e.g. if the UE is not subscribed to (failure in the previous steps with the UDM 11), multi-SIM not supported by the AMF 10, and/or not supported by the VPLMN), the AMF 10 informs the NG-RAN 5 about the lack of requested capability support with a new cause value (multi-SIM related cause value). The cause value corresponds to one/more of these: not subscribed, core network does not support, VPLMN does not support. For example, the cause value may be included in a Registration Accept message or in an N2 setup response message.

Step n+2: The RAN 5 informs of successful registration procedure. However, in case of lack of multi-SIM functionalities support if indicated in the above step 5, the NG-RAN 5 then sends this cause value to UE 3. The UE 3 then may try to register without any additional information with regard to multi-SIM e.g. as usual Single SIM registration. For example, the cause value may be included in the UE registration accept message.

FIG. 6 illustrates schematically a procedure to support a multi-SIM UE 3, where the SIMs 45 are registered to different AMFs 10.

The procedure shown in FIG. 6 is the same as that in FIG. 5, however with the difference that it allows and considers scenarios where different SIMs 45 are registered to different AMFs 10. Procedures as explained above are also applicable to FIG. 6. In this case, the UE Registration procedures for SIM #1 and SIM #2 are independent, but each with multi-SIM capability parameter (and corresponding required behaviour). In this case the NG-RAN 5 and/or the AMF 10 coordinates and ensures that both SIMs 45 are registered to the same AMF 10 (e.g. AMF1 10-1 or AMF2 10-2 in FIG. 6) without requiring AMF-relocation for SIM #1 and/or SIM #2 to a common AMF 10. Also, SIM #1 and SIM #2 may get registered to different AMFs 10 due to lack of sufficient information available with the AMFs 10 e.g. in the absence of additional information and required information provided by the UE 3 and/or the UDM 11. This also avoids the NG-RAN having to learn SIM #1 registered AMF and vice versa. SIM #1 and SIM #2 belong to the same PLMN.

Embodiment 2

The second embodiment proposes a method and a system to address one or more problems explained above specific to a UE 3 with more than one USIM 45. The embodiment proposes a method and a system as explained below:
  NG connection setup, whereby the NG-RAN 5 indicates its support (or lack of support) of Multi-SIM capability to the AMF 10 in N2 setup request message.
  NG connection setup response message from the AMF 10 indicating its support (or lack of support) of Multi-SIM capability capabilities.

Figure 7:
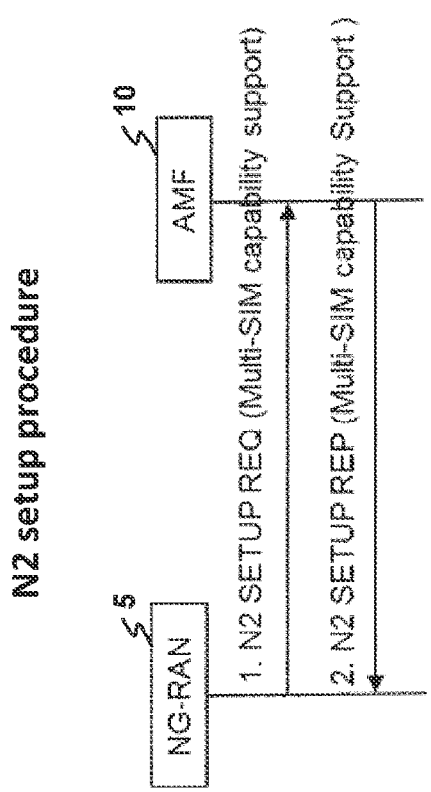
FIG. 7 illustrates schematically an exemplary N2 setup procedure.
Figure 8:
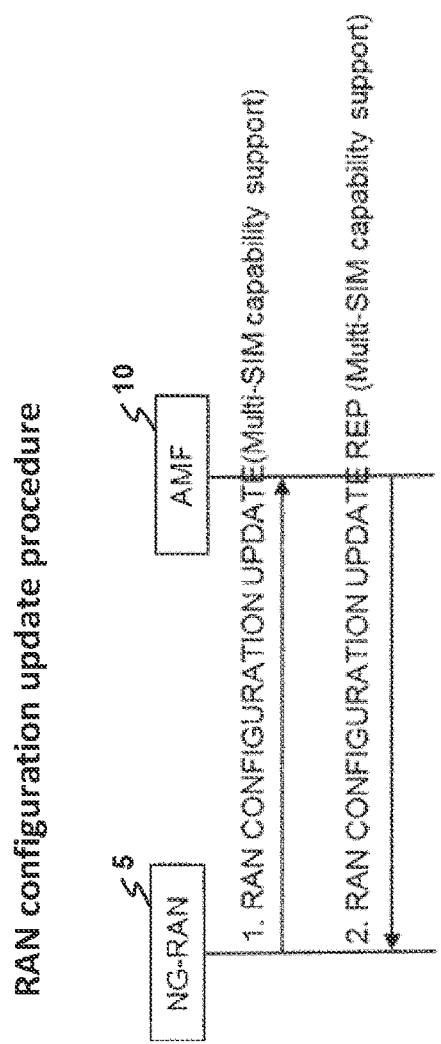
FIG. 8 illustrates schematically an exemplary RAN configuration update procedure.

FIG. 7 illustrates schematically an exemplary N2 setup procedure and FIG. 8 illustrates schematically an exemplary RAN configuration update procedure in accordance with the second embodiment.

In this example, the RAN configuration update procedure includes:
  a RAN configuration update request message whereby the NG-RAN 5 (base station) indicates its support (or lack of support) of Multi-SIM capability; and
  a RAN configuration update response message from the AMF 10 indicating its support (or lack of support) of Multi-SIM capability.

Embodiment 3

Figure 9:
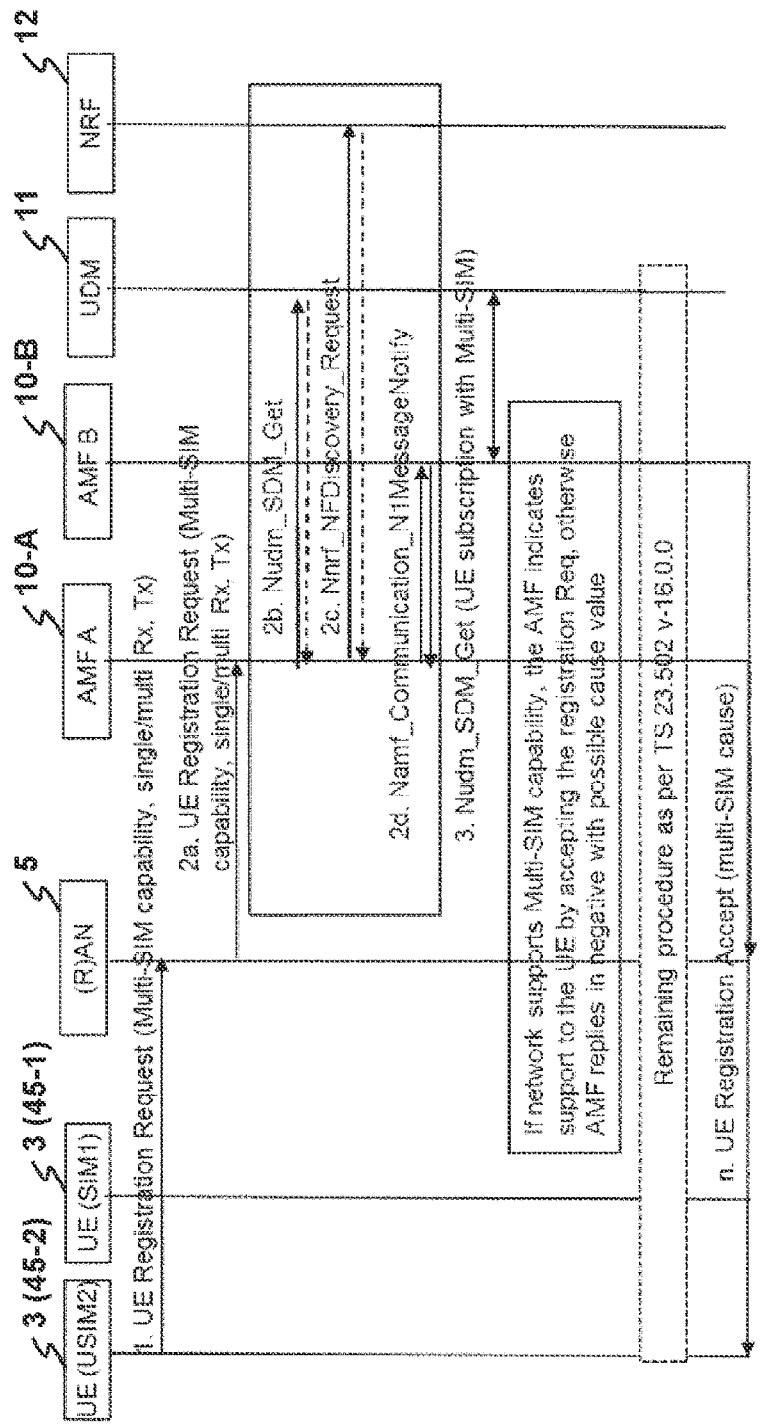
FIG. 9 illustrates schematically an exemplary registration procedure to support a multi-SIM UE, in case UE-SIM #1 and UE-SIM #2 are both registered to the same AMF.

FIG. 9 illustrates schematically an exemplary registration procedure to support a multi-SIM UE 3, in case UE-SIM #1 and UE-SIM #2 are both registered to the same AMF 10.

This embodiment allows a UE 3 with two/more SIMs 45 to notify its multi-SIM capability to the network and to get registered with the appropriate network functions (NFs). The method includes:
  An enhanced registration procedure whereby a multi-SIM capable UE 3 provides a new parameter, named here as Multi-SIM capability, in UE Registration Request message (to indicate support of services for two/more SIMs 45 in the same UE 3). Additionally, the UE 3 may also include information on whether it supports a single transceiver or multiple receivers/transmitters.
  This enables AMF functionality of selection and AMF re-location and/or other Core Network Function/entities selection that are suitable to provide the services required by the multi-SIM UE 3.
  Enabling the UDM 11 to store "multi-SIM" capability corresponding to UE's subscription profile.
  This also allows the AMF 10 to fetch subscription and policies information specific to multi-SIM support, from the UDM 11 and PCF, respectively.
  In step 2a, the RAN 5 forwards to a default/configured AMF A 10-A, then AMF re-location takes place e.g. newly proposed steps 2b, 2c, and 2d.
  In case the UE 3 requested multi-SIM capability is not supported, the AMF 10 informs the UE 3 with a possible cause e.g. due to lack of subscription, policies and/or no support of feature.

The procedures shown in FIG. 9 are explained below. The registration procedures for SIM #1 and SIM #2 are independent. In case of both SIMs having the same PLMN, AMF selection and re-location mechanisms results in the same AMF 10 (in this example, AMF B 10-B) being selected for both SIM #1 and SIM #2.

Step 1: The UE 3 requests registration of SIM #2. Compared to the registration procedure in 3GPP TS 23.502 V16.0.0, here the UE 3 also includes information indicating its multi-SIM capability, and additionally may also include information indicating the number of supported transceivers and receivers.

Step 2: In step 2a, the RAN 5 forwards the received NAS message to a default or a configured AMF 10 (in this example, AMF A 10-A). However, the AMF 10 based on the received UE capability information, decides to perform "AMF re-location" so that the UE 3 gets registered to an AMF 10 that provides features required by the UE 3 with two/more SIMs 45. AMF re-location is shown in step 2b and step 2c:

Step 2b: AMF A 10-A to UDM 11: Nudm_SDM_Get (Subscription Permanent Identifier (SUPI), multi-SIM Subscription data). The AMF A 10-A requests the UE's multi-SIM Subscription data from the UDM 11 by invoking the Nudm_SDM_Get service operation. In other examples, the UDM 11 may get this information from a Unified Data Repository (UDR). The UDM 11 replies to the AMF A 10-A.

Step 2c: AMF A 10-A to NRF 12: Nnrf_NFDiscovery_Request (NF type, AMF Set). If the AMF A 10-A does not locally store the AMF address that supports the requested Multi-SIM capability, then the AMF A 10-A invokes the Nnrf_NFDiscovery_Request service operation from the NRF 12 to find a proper target AMF 10 which has required NF capabilities to serve the UE 3. The NF type is set to AMF. The AMF Set is included in the Nnrf_NFDiscovery_Request. The NRF 12 replies with the list of potential AMFs 10 (a list of at least one AMF). The NRF 12 may also provide the details of the services offered by the candidate AMF(s) 10.

Accordingly, the NRF 12 keeps this additional information corresponding to the AMF 10 (e.g. UE's multi-SIM capability related information).

Step 2d: If the AMF A 10-A, based on local policy and subscription information, decides to forward the NAS message to the AMF B 10-B directly, then the AMF A 10-A invokes Namf_Communication_N1Message-Notify to the AMF B 10-B, carrying the rerouted NAS message.

Figure 10:
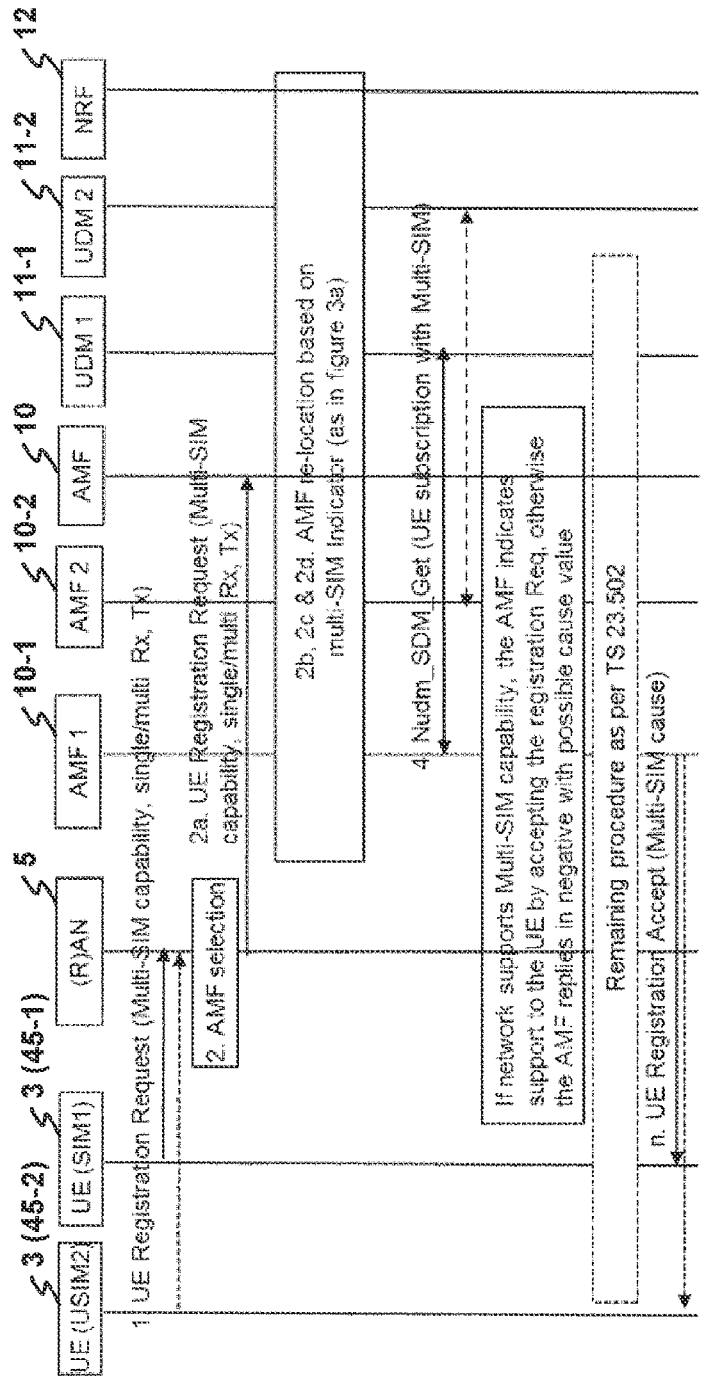
FIG. 10 illustrates schematically an exemplary registration procedure to support a multi-SIM UE, in case UE-SIM #1 and UE-SIM #2 are registered to different AMFs.

FIG. 10 illustrates schematically an exemplary registration procedure to support a multi-SIM UE 3, in case the SIMs are registered to different AMFs 10.

The procedure shown in FIG. 10 is the same as the one in FIG. 9, however with the difference that it allows and considers scenarios where different SIMs 45 are registered to different AMFs 10. The procedures explained above are also applicable to FIG. 10. UE Registration procedures for SIM #1 and SIM #2 are independent. SIM #1 and SIM #2 belong to same PLMN. AMF selection is based on steps 2b, 2c, and 2d. For example, the RAN 5 is unaware of the UE's 3 requested capabilities forwards to default or configured AMF 10 (shown as AMF in FIG. 10). Step 2b, 2c, and 2d are needed to ensure AMF relocation, and selecting AMF that provides features required by a UE 3 with two/more SIMs 45 (shown in FIG. 10 as AMF 1 10-1 and AMF 2 10-2 for SIM #1 and SIM #2 respectively).

Embodiment 4

In order to support multi-SIM specific features by the 5G core network 7 as well as a multi-SIM UE 3, the following parameters are added to the 'UE capability ID' and 'UE radio capability ID' information elements:

UE radio capability ID: number of receiver(s) and transmitter(s)

UE capability ID: multi-SIM indicator (to indicate that the UE 3 has more than one associated SIM 45)

Thus, in order to align with ongoing study on optimizations of UE radio capability signaling or Radio Capabilities Signalling Optimisation (RACS) defined in 3GPP Technical Report (TR) 23.743 v2.0.0, the feature of "the dictionary used for translation of these IDs" needs to be updated based on the present proposal. Specifically, the corresponding message is enhanced to include at least one of the multi-SIM specific parameters: multi-SIM indicator and number of Tx/Rx.

Figure 11:
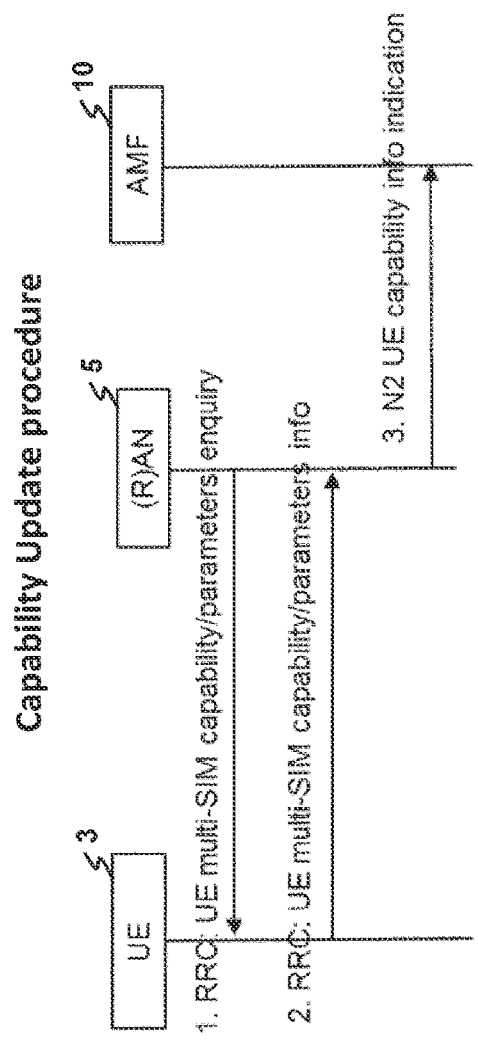
FIG. 11 illustrates schematically an exemplary capability update procedure between a multi-SIM UE, (R)AN and AMF.

These corresponding messages are exchanged between:
  I. UE Capability Management Function (UCMF) and AMF
  II. AMF and Application Function (AF), either directly or via a Network Exposure Function (NEF)
  III. AF and UCMF An example of update procedure is shown in FIG. 11. If the AMF 10 has not provided the UE Radio Capability as part of establishment of UE context in the RAN 5, the RAN 5 retrieves the UE Radio Capability over the radio interface and notifies the AMF 10 using the 'N2 UE Capability Info Indication' message.

Step 1: The RAN 5 requests UE radio capability and UE capability, in case it has not yet received them e.g. via different procedures.

Step 2: The UE 3 replies with its Radio capability and UE capabilities.

Step 3: The RAN 5 provides the received capabilities to the AMF 10.

SUMMARY

Beneficially, the above described aspects include, although they are not limited to, one or more of the following functionalities:

1) The UE provides a multi-SIM capability indicator and/or UE radio capability to the (5G) core network:
  a. this enables AMF functionality of selection and AMF re-location and/or selection by other Core Network Function/entities of a suitable NF to provide services required by a multi-SIM UE 2) The UE provides multi-SIM capability indicator and/or UE radio capability to the 5G RAN:
  a. this enables RAN functionality to select AMF and/or relocate AMF most suitable to provide services required by multi-SIM UE. For example: in embodiment 1, in the newly proposed feature in step 2 after receiving these parameters, RAN forwards the request to a suitable AMF (instead of a default AMF). To determine the most suitable/appropriate AMF, there are multiple options:
    i. RAN may have a list including at least of (pre-)configured AMFs for this purpose;

ii. RAN follows procedures as explained in embodiment 2 (shown in FIG. 7), to find the most suitable AMFs;
iii. RAN follows procedures as explained in embodiment 2 (shown in FIG. 8), to find the most suitable AMFs.
3) Core Network and RAN provide an appropriate cause value to the UE. The cause value indicates whether or not the requested network entities support features requested by the UE with two/more SIMs, in order to allow the UE to register and/or request required services with a suitable RAN and AMF.
   a. Example: as explained in embodiment 1, the RAN informs lack of requested capability support to the UE. The UE then may join another RAN (e.g. in overlapping coverage-area cases) or fallback to normal behavior and/or the like.
4) The NRF maintains a list of AMF(s) that supports multi-SIM capabilities, and corresponding functionalities. Based on this information the NRF may also provide information to the AMF in order to assist AMF relocation.
5) Additional parameters proposed to be included in 'UE capability ID' and 'UE Radio capability ID'.

In order to provide these functionalities, the above aspects describe exemplary methods comprising (at least some of) the following steps:

Embodiment 1: RRC Based Procedure

The UE includes in RRC message its capability information such as "Multi-SIM capability"
Additionally, the UE includes information about its transceiver(s) e.g. single Tx/Rx or multiple Rx and Tx.
RAN functionality to select (and/or relocate) AMF suitable to provide services required by multi-SIM UE, as in steps 2a in FIGS. 5 and 6.
The RAN may also inform lack of requested capability support to the UE. The UE then may join another RAN (e.g. in overlapping coverage-area cases) or fallback to normal behavior. To achieve this, the RAN may periodically broadcast and/or provide its (multi-SIM) capability information which can be monitored by the UEs to know before sending a request to the RAN.

Embodiment 2: N2 Connection Setup and RAN Configuration Update

The RAN and AMF exchange multi-SIM related capability.

Embodiment 3: Registration Procedure

The UE includes in the registration request message its multi-SIM capability request, and additionally supported receiver and transmitters.
The AMF, on receipt of the information from the UE, performs/initiates AMF re-location, e.g. as shown in steps 2b, 2c, and 2d in FIGS. 9 and 10.
The NRF maintains a list of AMFs that support multi-SIM capabilities, and corresponding functionalities. Based on this information the NRF may also provide information to the AMF in order to assist AMF relocation.
The AMF may reply back to the UE with appropriate cause information, in case of failure to accept the UE's registration request.

Embodiment 3: RACS Procedure

Additional parameters proposed to be included in the 'UE capability ID' information element and the 'UE Radio capability ID' information element.
These parameters are then updated as shown in FIG. 11.

Benefits

The above described multi-SIM capability negotiation ensures registration to a more suitable RAN and/or core network functions e.g. to ensure requested and optimal behaviour. This additionally avoids failure possibilities post-registration, if the requested functionalities for UEs with more than one SIMs are not supported.

MODIFICATIONS AND ALTERNATIVES

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

The method performed by the UE may further comprise receiving a message for rejecting the RRC message, the received message comprising a reject cause.

The method performed by the UE may further comprise transmitting, when said RRC message is rejected, another RRC message without said information indicating a Multi-SIM capability of the UE for selecting an AMF for the UE.

The information indicating a Multi-SIM capability of the UE may comprise a 'UE capability ID' information element.

The method performed by the UE may further comprise transmitting information indicating a number of transceivers associated with said plurality of SIMs (e.g. in a 'UE Radio capability ID' information element).

The method performed by the node of a RAN may further comprise obtaining, from at least one AMF, information indicating whether that AMF supports said Multi-SIM capability, and selecting an AMF for the UE based on the obtained information. The information may be obtained by the node of a RAN during an N2 Setup procedure or during a RAN Configuration Update procedure performed with said at least one AMF.

The method performed by an AMF may further comprise: i) when the UE has a subscription for Multi-SIM, registering the UE with the AMF for Multi-SIM; and ii) when the UE does not have a subscription for Multi-SIM, rejecting registration of the UE with the AMF using an appropriate reject cause. When the AMF does not support Multi-SIM, the method performed by an AMF may further comprise re-routing the UE to a different AMF that supports Multi-SIM.

The verifying by the AMF may be based on subscription information associated with the UE obtained from a Unified Data Management (UDM) function or a Unified Data Repository (UDR) function.

When at least one of said plurality of SIMs is registered to a different AMF, the method performed by an AMF may further comprise performing AMF relocation with respect to at least one of said plurality of SIMs, for registering said plurality of SIMs at the same AMF.

Various other modifications will be apparent to those skilled in the art and will not be described in further detail here.

LIST OF ABBREVIATIONS

3GPP 3$^{rd}$ Generation Partnership Project
AF Application Function
AMF Access and Mobility Management Function
API Application Programming Interfaces
EPS Evolved Packet System
GPRS General Packet Radio Services
GTP-C GPRS Tunneling Protocol
HOL Head of Line
HTTPS Hyper Text Transfer Protocol Secure
MNO Mobile Network Operator
NEF Network Exposure Function
NF Network Function
NRF Network Repository Function
PCF Policy Control Function
RAN Radio Access Network
QoS Quality-of-Service
QUIC Quick UDP Internet Connections
REST Representational State Transfer
SDL Shared Data Layer
SLA Service level agreement
SMF Session Management Function
TCP Transport Control Protocol
TLS Transport Layer Security
TTI Transmission Time Interval
UDM Unified Data Management
UDR Unified Data Repository
UPF User Plane Function
UE User Equipment
UICC Universal Integrated Circuit Card
(U)SIM Universal Subscriber Identity Module

LIST OF REFERENCES

[1] 3GPP TR 21.905: "Vocabulary for 3GPP Specifications". V15.0.0 (2018-03)
[2] 3GPP TS 23.501: "System Architecture for the 5G System; Stage 2". V16.0.0 (2019-03)
[3] 3GPP TS 23.502: "Procedures for the 5G System; Stage 2" V16.0.0 (2019-03)
[4] New SID: Study on system enablers for multi-SIM devices http://www.3gpp.org/ftp/tsg_sa/TSG_SA/TSGS_82/Docs/SP-181251.zip
[5] 3GPP SA2 TR 23.743 v2.0.0: Study on optimizations of UE radio capability signalling

The invention claimed is:

1. A method performed by a User Equipment (UE) comprising a plurality of Subscriber Identity Modules (SIMs), the method comprising:
   transmitting to an Access and Mobility Management Function (AMF) apparatus, in a first Non-Access Stratum (NAS) message, first information indicating a Multi-SIM capability of the UE; and
   receiving, from the AMF apparatus, in a second NAS message, second information including a Multi-SIM related value, based on the first information and a Multi-SIM feature supported by network,
   wherein the Multi-SIM related value is configured to indicate whether the Multi-SIM capability of the UE indicated by the first information is also supported by the network.

2. A method performed by an Access and Mobility Management Function (AMF) apparatus, the method comprising:
   receiving, from a User Equipment (UE) comprising a plurality of Subscriber Identify Modules (SIMs), in a first Non-Access Stratum (NAS) message, first information indicating a Multi-SIM capability of the UE; and
   sending, to the UE, in a second NAS message, second information including a Multi-SIM related value, based on the first information and a Multi-SIM feature supported by network,
   wherein the Multi-SIM related value is configured to indicate whether the Multi-SIM capability of the UE indicated by the first information is also supported by the network.

3. A non-transitory computer readable storage medium that stores computer executable instructions that cause, when executed by one or more computers, the one or more computers to:
   received, from a User Equipment (UE) comprising a plurality of Subscriber Identity Modules (SIMs), in a first Non-Access Stratum (NAS) message, first information indicating a Multi-SIM capability of the UE; and
   send, to the UE, in a second NAS message, second information including a Multi-SIM related value, based on the first information and a Multi-SIM feature supported by network,
   wherein the Multi-SIM related value is configured to indicate whether the Multi-SIM capability of the UE indicated by the first information is also supported by the network.

4. The method according to claim 1, wherein the first NAS message is a registration request message, and the second NAS message is a registration accept message.

17

5. The method according to claim 2 further comprising:
determining whether the Multi-SIM capability of the UE indicated by the first information is also supported by the network, based on the Multi-SIM feature supported by the network.

6. The method according to claim 2, wherein the first NAS message is a registration request message, and the second NAS message is a registration accept message.

7. A User Equipment (UE) comprising a plurality of Subscriber Identity Modules (SIMs), the UE comprising:
at least one memory storing instruction, and
at least one processor configured to execute the instructions to:
transmit, to an Access and Mobility Management Function (AMF) apparatus, in a first Non-Access Stratum (NAS) message, first information indicating a Multi-SIM capability of the UE; and
receive, from the AMF apparatus, in a second NAS message, second information including a Multi-SIM related value, based on the first information and a Multi-SIM feature supported by network,
wherein the Multi-SIM related value is configured to indicate whether the Multi-SIM capability of the UE indicated by the first information is also supported by the network.

8. The UE according to claim 7, wherein the first NAS message is a registration request message, and the second NAS message is a registration accept message.

18

9. An Access and Mobility Management Function (AMF) apparatus, the AMF apparatus comprising:
at least one memory storing instructions, and
at least one processor configured to execute the instructions to:
receive, from a User Equipment (UE) comprising a plurality of Subscriber Identity Modules (SIMs), in a first Non-Access Stratum (NAS) message, first information indicating a Multi-SIM capability of the UE; and
send, to the UE, in a second NAS message, second information including a Multi-SIM related value, based on the first information and a Multi-SIM feature supported by network,
wherein the Multi-SIM related value is configured to indicate whether the Multi-SIM capability of the UE indicated by the first information is also supported by the network.

10. The AMF apparatus according to claim 9, the at least one processor configured to further execute the instructions to:
determine whether the Multi-SIM capability of the UE indicated by the first information is also supported by the network, based on the Multi-SIM feature supported by the network.

11. The AMF apparatus according to claim 9, wherein the first NAS message is a registration request message, and the second NAS message is a registration accept message.

* * * * *